United States Patent [19]

Klinke

[11] 4,180,971
[45] Jan. 1, 1980

[54] DETACHABLE LINK

[76] Inventor: Bernhard R. Klinke, 6902 - 226th Pl. Southwest, Mountlake Terrace, Wash. 98043

[21] Appl. No.: 900,888

[22] Filed: Apr. 28, 1978

[51] Int. Cl.² ............... F16G 15/04; F16G 15/12
[52] U.S. Cl. ............................................. 59/87
[58] Field of Search ............... 59/87, 84, 85, 88, 93; 152/233

[56] References Cited

U.S. PATENT DOCUMENTS

| 70,380 | 10/1867 | Vanstone | 59/87 |
|---|---|---|---|
| 774,189 | 11/1904 | Laughlin | 59/87 |
| 894,223 | 7/1908 | Nelsen | 59/87 |
| 1,358,108 | 11/1920 | Powell | 59/87 |
| 1,906,570 | 5/1933 | Gilbert | 59/87 |

FOREIGN PATENT DOCUMENTS

| 2034985 | 1/1972 | Fed. Rep. of Germany | 59/87 |
|---|---|---|---|
| 79527 | 12/1918 | Switzerland | 59/85 |
| 229 | of 1877 | United Kingdom | 59/88 |

*Primary Examiner*—Francis S. Husar
*Assistant Examiner*—Gene P. Crosby
*Attorney, Agent, or Firm*—Thomas W. Secrest

[57] ABSTRACT

A detachable link is disclosed having identical overlapping members secured together by a cylindrical pin. Lengths of chain can be joined quickly, and, when necessary, to be detached or separated from one another, quickly. One place where such detachable links find particular application is in a ship's anchor cable wherein the detachable links are used to join together shots or sections of chain.

6 Claims, 7 Drawing Figures

DETACHABLE LINK

THE BACKGROUND OF THE INVENTION

A chain is made of links. The links may be a loop or a circle (stud or open configuration). Or, the links may be dielocked links wherein there is a center connection defining two circles within the link.

Normally, a chain is made at a factory as there are facilities which can readily make the links of chain and also join the links of chain.

The chain maybe of various lengths. At times, in the field and away from the factory, it may be necessary to join together various lengths of chain. In the field there is not present the necessary facility for using a unitary link to join together the various lengths of chain.

I know of a detachable link comprising three (3) cast or forged parts. The detachable link consists of a link and two (2) lugs. The link and two (2) lugs maybe cast or forged parts. There is a forelock pin connecting the link and two lugs into a detachable link.

The link is of a, generally, U-configuration having a base and two curving legs. The legs curve back on themselves and end in two circular knobs. In a cross-sectional view the link is of a, generally, circular configuration.

The two lugs are similar, but are different in order to be able to mate and fit together. Each lug is of a, generally, T-configuration. Each lug is, approximately, one-half the thickness of the link. Each lug has two spaced apart half-sockets for receiving and, partially, encircling the circular knobs of the links. Further, there is a central recess and in the central recess there is a circular member. There is a central passageway in the central recess and in each circular member. The circular members in each lug must be offset from each other so that the lugs co-fit with each other and over the circular knob on the end of each leg of the link.

The link and the two lugs may be assembled so that the two lugs fit over the circular knob on the ends of the two legs of the link and also that the circular member in each lug fits in the central recess in the other lug. The circular member in one lug is offset from the circular member in the other lug so that the two lugs will co-fit. In assembling the link a pin is driven through the passageways in the two circular members and also in the base of the link. This pin unites the three (3) cast or forged members into the detachable link.

From the foregoing description this detachable link it is seen that there are three cast or forged pieces. Normally, the detachable link will be made of cast metal. Therefore, it is necessary to have three separate and distinct dies to form the three cast pieces of detachable link.

The cost of making three special dies for the detachable link is greater than the cost of making one die for a detachable link.

THE GENERAL DESCRIPTION OF THE INVENTION

This invention is a detachable link comprising two generally U-shaped overlapped mating halves. Each mating half is the same as the other. In each mating half there are aligning pins and sockets for aligning one mating half with the other mating half. Also, each half has a boss with a through passageway. A pin maybe inserted in the through passageway to join the two overlapped mating halves. The bosses with the pin define a detachable dielock link.

As the mating halves are the same in order to have a cast half it is necessary to have only one die. As stated earlier the detachable link I have previously described required three dies to make the cast parts for the link while with the subject link only one die is required for the link.

THE DRAWINGS

Figure 6:
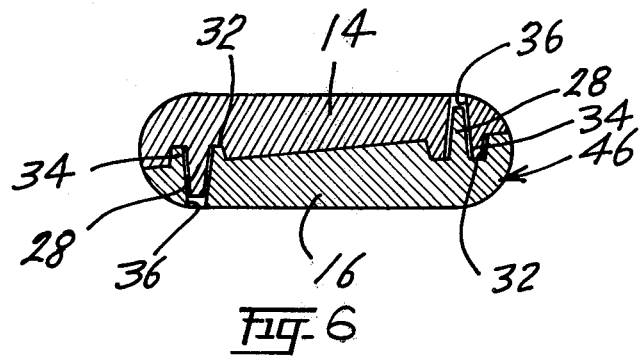
Figure 7:
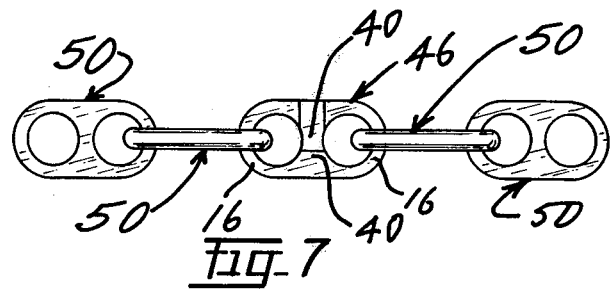

FIG. 6 is a lateral cross-sectional view illustrating the two members 10 united with the pins and the sockets and the surfaces 30 flush with each other in the link 46; and, FIG. 7 is an illustration of a detachable link 46 joining together two separate chains of dielock links so as to form a longer chain by means of the detachable link.

THE SPECIFIC DESCRIPTION OF THE INVENTION

In FIGS. 1, 2, 3 and 4 it is seen that there is a member or mating half 10 comprising a base 12 and having two legs 14 and 16. In the drawings it is seen that the base 12 is thicker than the leg 14 or the leg 16. In the drawing it is seen that the base comprises a raised portion 20, as compared with the leg 14 or the leg 16. At the junction of the raised portion 20 of the base 12 and the inner part of the leg there is a sloping shoulder 22.

It is seen that the leg 14 and the leg 16 extend away from the base 12 and curve around so that the outer or extremity of the leg curves back on the inner portion of the leg near the base 12. It is seen that the leg 14 has an end 24 and that the leg 16 has an end 26. The distance between end 24 and the end 26 is greater than the length of the base 12 or the length between the junction of the sloping shoulder 22 and the leg 16 and the sloping shoulder 22 and the leg 14. This makes it possible for the other member or other mating half of the detachable link to overlie the first member or the first mating half of the detachable link for accomodation of the ends of the legs of one member with the base of the other member of the detachable link.

In FIGS. 1, 2, 3 and 4 it is seen that that part of the leg near the base 12 has a pin 28. The pin 28 projects above the surface 30 of the leg. Also, in the Drawings it is seen that there is a circular recess 32 which surrounds the pin 28 and which recess is below the surface 30 of the leg. It is to be clearly understood that in each leg near the base 12 there is the pin 28 projecting above the surface 30 of the leg and also the circular recess 32 which is recessed below the surface 30 of the leg.

In the drawings it is seen that in the extremity of each leg near the end of each leg that there is a circular raised portion 34 which projects above the surface 30 of the leg. In the center of the circular raised portion 34 there is a circular socket or circular recessed part 36. In the drawings, it is seen that the circular socket 36 extends below the surface 30 of the leg.

In the Drawings it is seen that when the two members or two mating halves overlie each other with the ends 24 and 26 of the legs of the first member adjacent to the base 12 of the second member that the pins 28 of one member are positioned in sockets 36 of the other member so as to align the two members 10.

In the drawings it is seen that the member 10 there is intergal in connecting with respect to the base 12 a boss 40. The boss 40 projects inwardly from the base 12 and towards that open space between the ends 24 and 26 of the legs. In the base 12 and the boss 40 there is a passageway 42. In the drawings it is seen that the boss 40 and the passageway 42 are at a normal position to longitudinal axis of the base 12.

Figure 1:
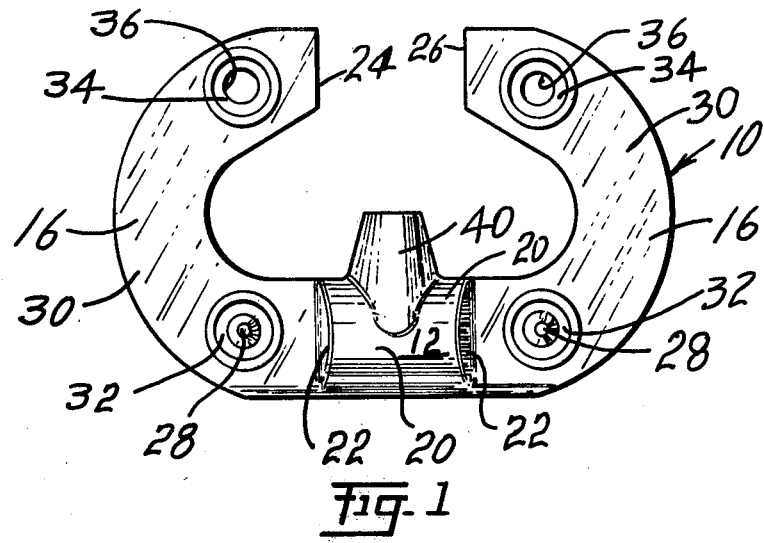
FIG. 1 is a plan view of a member of a mating half and illustrates the base, the curving legs, the pins and the sockets.
Figure 2:
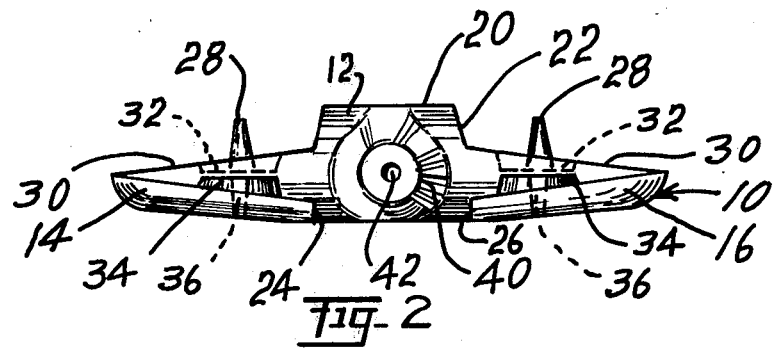
FIG. 2 is a front elevational view of a member or a mating half and illustrates the base, the boss and through passageway in the base and the boss, the curving legs which decrease in thickness as the legs extend away from the base, and the pins and the sockets.
Figure 3:
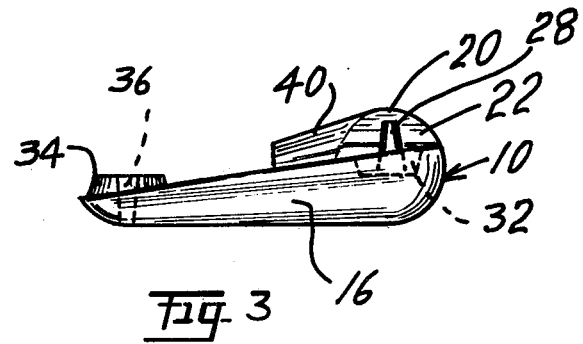
FIG. 3 is a side elevational view of the member or mating half and illustrates that the base is thicker than the legs and also illustrates the boss, and the decreasing thickness of the legs as the legs extend away from the base, and the pin and the socket.
Figure 4:
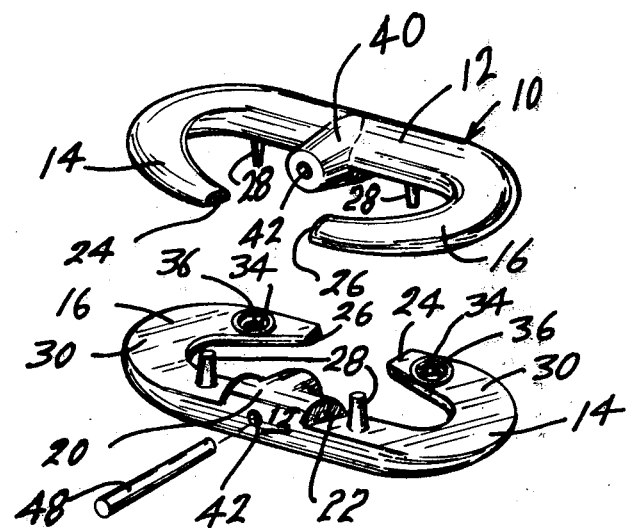
FIG. 4 illustrates two spaced apart members or mating halves and illustrates the sockets in the extremities of the legs for receiving the pins near the base or in that part of the legs near the base and also the bosses with through passageways for receiving a pin for uniting the two mating halves to make a detachable link.
Figure 5:
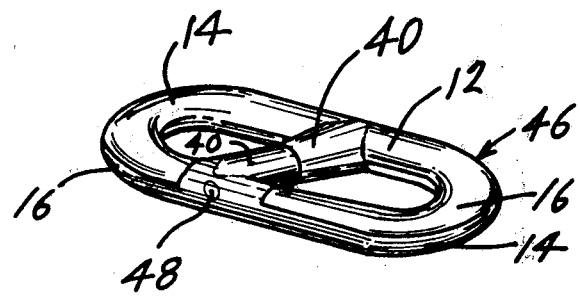
FIG. 5 is a perspective view illustrating the detachable link as composed of the two members or two mating halves united by the pin.

In assembling the two members 10 to form a detachable link 46, see FIG. 5, it is seen that the two members 10 are positioned so that they overlie, see FIG. 4. The two members 10 are positioned so that the extremities of the legs are near the slopping shoulders 22 of the base 12. Also, the surfaces 30 of the legs of the two members are, substantially, flush with each other. In addition, the pins 28 of one member 10 are positioned in the sockets 36 of the other member 10. The pins in sockets function as aligning means for the two members 10. To firmly join together the two members 10 into the detachable link 46 there is used a pin 48. The pin 48 is driven through a passageway 42 in each of the bosses 40 so as to unite the two members 10 into the link 46. At times, it may be necessary to separate the link 46 into the two members 10. This can be accomplished by pounding out or removing the pin 48 from the passageway 42 in the boss and the base.

It is seen that the link 46 can be made from two identical members 10 or two members 10 which are mirror-images of each other or the member 10 can be considered to be half a link. One advantage of the member 10 and the link 46 made from the members 10 is that it is necessary to have only one die for making a cast member 10. With one die there is less investment in order to make the cast member 10. Further, with one member 10 and not three separate cast pieces there are fewer parts required for inventory and therefore less investment in inventory for the detachable link. In addition, the link 46 is more versatile than other detachable links as there are fewer parts in the link 46 than in other detachable links. Also, I consider it is easier and less difficult to assemble the link 46 from the members 10 as there are fewer parts and, therefore, less possibility to make a mistake in assembling the link. The detachable link 46 can be readily assembled from two members 10 and also can be readily disassembled into the two members 10. Another facet of the link 46 is that it has approximately the strength of dielock links ajoined together to form a chain. Also, it is conceivable that a chain can be formed from a number of detachable members 10.

I consider my invention to be new as I do not know of another detachable link which can be made from a plurality of the same members. The detachable link I described in the early part of this specification required three separate pieces which required three separate dies. This detachable link requires two separate pieces from only one die.

I consider my invention to be useful as it is possible to prepare a detachable link and for the detachable link to join together two links of chain.

From the foregoing and having presented my invention, what I claim is:

1. A detachable link comprising a pair of identical members of generally U-configuration assemblable in overlapping relationship to form a closed link;
    each of said members having a generally circular cross section at the base thereof, said base having an inwardly extending boss terminating in a flat face, the base and boss having a generally circular passageway extending therethrough perpendicular to the face of said boss;
    each of said members having symmetrical, arcuate leg portions tapering in thickness from the base to the termination thereof;
    each of said leg portions having at least one aligning means, said aligning means comprising an upstanding tapered conical pin having a recessed portion around its base and a raised conical socket, the height of said pin being less than the thickness of said leg portion, said pin and socket positioned so that the pin of one member mates in the socket of the other member, and
    a removable, cylindrical pin positioned in said passageway.

2. A link according to claim 1 wherein the flat face of said boss of one member of said pair abuts the boss face of the other member when said members are assembled in overlapping relationship.

3. A link according to claim 1 and comprising:
    a. said base being of greater thickness than said leg portions.

4. A link according to claim 1 and comprising:
    a. said leg portions curving around so that a leg curves back on itself.

5. A link according to claim 1 and comprising:
    a. said base being of greater thickness than said leg portions;
    b. each said leg portion curving back on itself; and,
    c. the distance between the free ends of said legs being greater than the length of said base.

6. A method for making a detachable link, said method comprising:
    forming a pair of identical members of generally U-configuration, each of said members having a generally circular cross section at the base thereof, said base having an inwardly extending boss terminating in a flat face, the base and boss having a generally circular passageway extending therethrough perpendicular to the face of said boss;
    each of said members having symmetrical, arcuate leg portions tapering in thickness from the base to the termination thereof;
    each of said leg portions having at least one aligning means, said aligning means comprising an upstanding tapered conical pin having a recessed portion around its base and a raised conical socket, the height of said pin being less than the thickness of said leg portion, said pin and socket positioned so that the pin of one member matably fits in the socket of the other member;
    assembling said members in overlapping relationship to form a closed link, and
    positioning a cylindrical pin in said passageway to unite the two members.

* * * * *